Nov. 22, 1966  OSAMU INOU ET AL  3,286,540

STEPLESS SPEED CHANGE GEAR

Filed Nov. 10, 1964  6 Sheets-Sheet 1

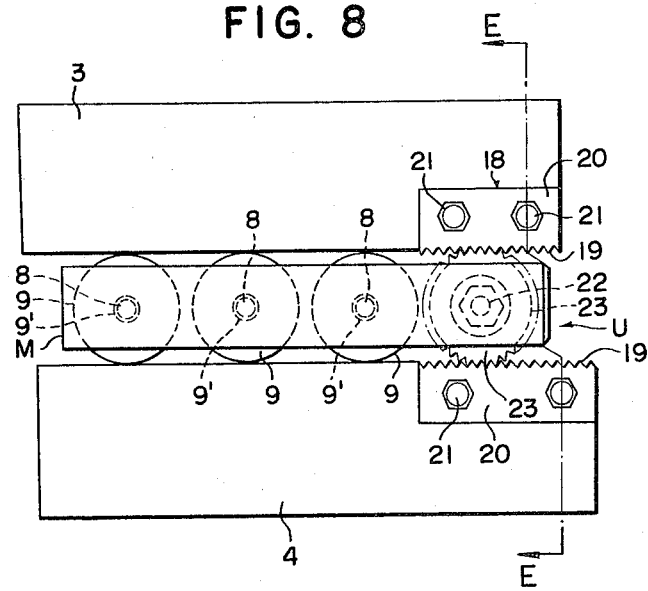
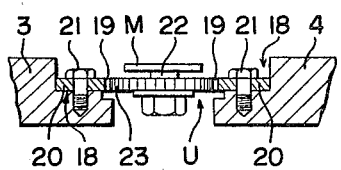
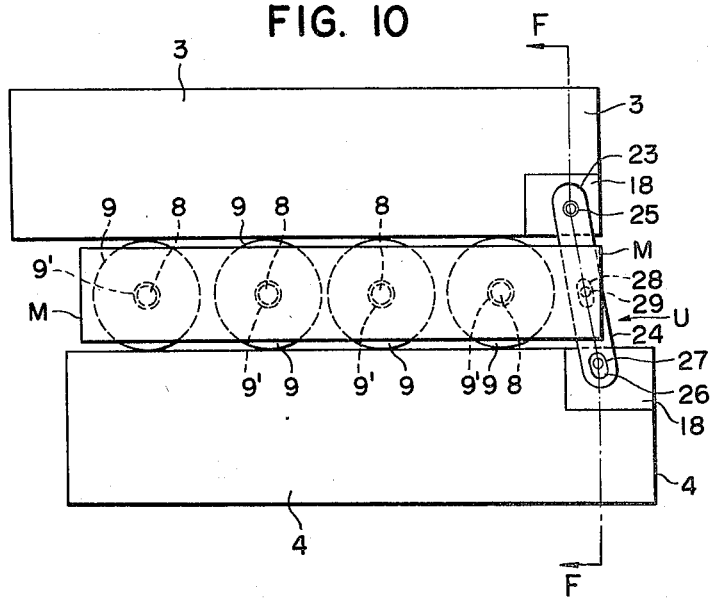

United States Patent Office 3,286,540
Patented Nov. 22, 1966

3,286,540
STEPLESS SPEED CHANGE GEAR
Osamu Inou, Sakyo-ku, Kyoto-shi, and Ichiro Yamanaka, Ibaragi-shi, Osaka-fu, Japan, assignors to Nihon Spindle Seizo Kabushiki Kaisha, Hoyogo-ken, Japan
Filed Nov. 10, 1964, Ser. No. 410,138
Claims priority, application Japan, Nov. 14, 1963, 61,304/63
7 Claims. (Cl. 74—230.17)

The present invention relates to improvements in a stepless speed change gear of the variable effective diameter type having a movable sheave which accordingly varies the running speed of a belt on the sheave.

Generally in a stepless speed change gear, it has been well known to change the running speed of a belt by varying an effective diameter of a pulley by the effect of sliding of a half sheave in the axial direction.

The conventional device of the kind has been either provided with a key on a rotary shaft by which a movable half sheave slides in axial direction by transmitting power on the side of a key, or with a spline in place of a key, but both systems have the disadvantage of causing exhaustion of oil and fretting corrosion between a shaft and a sheave as well as between a key and a spline due to large surface friction produced from sliding after long use. In such devices it has been required to exercise care in the design of an oiling means. Still more difficult was to oil every part of the sliding surfaces even when complete oiling was not neglected. In addition, overhaul and cleaning after short time of use was required and this resulted in considerable maintenance.

An attempt has been made to overcome the trouble of continuous oiling and thereby to prolong a period of oiling by providing balls in the movable sheave or to fit bearings on a shaft and a hardened tyre on the outer circumference so as to move the sheave in contact with a key.

This device intended to provide two bearings aligned along a main shaft either directly on the main shaft or between a fixed pressure receiver of a fixed sheave and a pressure receiver of a movable sheave in order to facilitate sliding on the movable part of the sheave which serves as a rolling contact. In this construction, too, it is still required to provide a large number of such bearings aligned along a shaft in case of a large load so as to uniformly receive the load of a speed change gear, since each contact part between a ball and a shaft, a ball and a sheave, or a hardened tyre and a key forms a point or a line contact part even if number of balls or tyres is increased and contact is given in two points on two lines.

Particularly in case of two bearings aligned front and rear, two lines contact is necessitated, and friction between each other is increased. Therefore, in case of a big load, it is preferable to have the load on the speed change gear uniformly imparted to each of the bearings by providing as many bearings of the kind in a straight line along the axial direction.

It is however practically impossible to provide a multiple number of bearings exactly on a rectilinear line along a shaft due to effect of tolerance. Actually at least one or two bearings alone are subjected to load and these are quickly broken. In a short period of time, there occurs disarrangement in the entire mechanism and this makes long endurance very difficult.

Defects have also been experienced by the provision of a multiple number of rollers between respective pressure receivers of a sheave in a free condition, because vibration load produced when a stepless speed change gear is working acts on the roller and the roller leans to one side. When a movable sheave is shifted in such direction, the roller is not enough spaced to roll so that there will take place a sliding friction between the roller and the pressure receiver thereby making the shifting motion of the movable sheave very difficult and producing wear on the contact part between the two bodies.

The object of this invention is to overcome these defects of the conventional device and to provide an improved device of the above character constructive far long usage by preventing shock in the mechanism, wear and mechanical slackness.

Another object of this invention is to provide as many rollers as possible between the fixed and movable pressure receivers in the stepless speed change gear so as to make the displacement of the sheave easy in axial direction.

Another object of this invention is to provide a simple stepless speed change gear having as many rollers as possible interposed between the movable and fixed pressure receivers so as to support uniform load rendered on all the rollers of multiple number in order to dissipate and bear said load and to insure the transmission of large horse power.

A further object of the invention is to propose a stepless speed change gear having a multiple number of rollers interposed between the movable pressure receiver and the fixed pressure receiver and having a means to minimize the wear of said rollers such as caused from contact, relative sliding, fretting corrosion, etc. occurring in the rotation of the rollers so as to elevate the endurance as greatly as possible.

Another object of this invention is to interpose the rollers consisting of many rolling units between the pressure receivers in contact therewith so that the rollers will roll and move accompanying with and relative to the movement of the movable sheave not to cause sliding friction but to allow the roller to move reasonably, facilitate the movement of the movable sheave and further to prevent the wear of the contact part.

Still another object of the invention is to provide a stepless speed change gear which does not require continuous oiling for the movement of the movable pressure receiver nor constant periodic oiling and which is able to eliminate wear due to surface friction, to prevent rust or oil stains and to have a long life with minimum maintenance.

This invention will now be illustrated according to one embodiment with reference to the accompanying drawings in which, FIG. 1 is a side elevation in cross section of the device on the line A—A in FIG. 2;

FIGS. 6 to 15 are other embodiments constructed within the spirit of this invention;

FIG. 6 is a side elevation in cross section on the line C—C in FIG. 7;

FIG. 7 is a front elevation in cross section on the line D—D in FIG. 6;

FIG. 8 is a plan view of principal part of the device according to this invention;

FIG. 9 is a cross section on the line E—E in FIG. 8;

FIG. 10 is a plan view of other embodiment showing principal part of the device according to this invention;

FIG. 11 is a cross section on the line F—F in FIG. 10;

FIGS. 12 and 13 are front views in a cross section of other example of embodiment;

FIGS. 14 and 15 show still other examples; FIG. 14 is a side elevation in cross section on the line G—G in FIG. 15;

FIG. 15 is a front view in cross section on the line H—H in FIG. 14.

Figure 1:
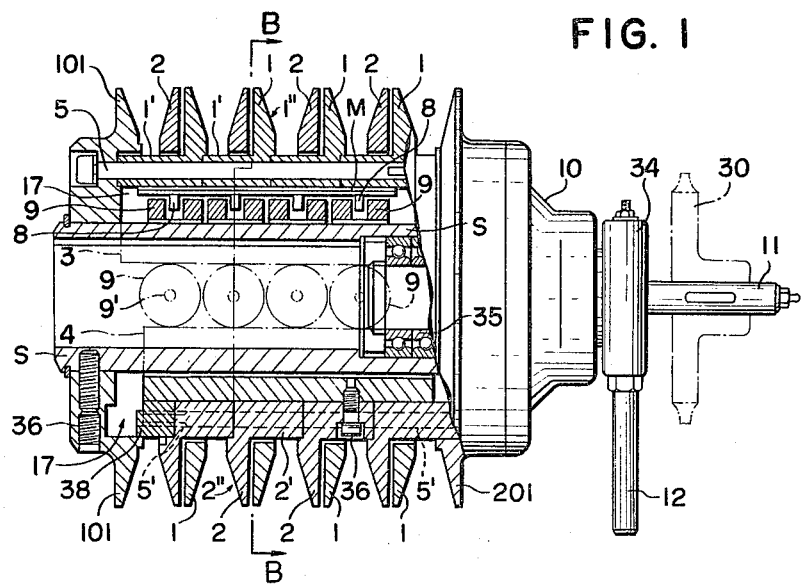

The invention will now be illustrated in more details according to one example of an embodiment with reference to the accompanying drawings.

Referring to FIGS. 1 to 5. In a V-pulley, sheave discs 1 and 2 on the same side are connected by extension bosses 1' and 2' of quadrant provided on the sheave discs 1 and 2. The disc groups face opposite with each other, so that by shifting sheave disc group on one side in axial direction, the effective diameter of each V groove is changed. Between the pressure receivers 3 and 4 respectively provided on the fixed and movable sheaves, there are provided a plurality of rollers 9 in contact with said pressure receivers and the rollers are supported by a holder M mounted freely between the pressure receivers 3 and 4.

The aforementioned sheave discs 1 and 2 have conical-shape faces 1" and 2" on which is wound a belt. The extension bosses 1' and 2' are fixed on the fan-like pressure receivers 3 and 4 integrally with rods 13 and 14. The sheave discs 1 and 2 on the same side are connected by the connecting rods 5 and 5' forming thus a sheave disc group. The sheave disc groups are combined in a manner that one sheave disc faces other sheave disc in opposites and the groups are inserted on the main shaft S. One sheave disc group on the same side is fixed on the main shaft S by a key 15 which is to be referred to as the fixed sheaves and other sheave disc group on the other side is mounted slidably in axial direction and is referred to as movable sheaves.

Between the fan-like pressure receivers 3 and 4 respectively provided on the fixed sheaves and the movable sheaves are formed and interspaced each in definite area, into which are inserted a holder M supporting rollers 9.

Said holder M is provided width and length suitable for fitting freely between the pressure receivers 3 and 4, 3 and 4. The outside 6 of the holder M takes a circular form to fit to the inside of the extension bosses 1' and 2' of quadrant. Inside the holder 7 there are formed roller supports 8 consisted of a plurality of projections and recesses at definite intervals. It is preferable to make this holder M of synthetic resin such as antifrictionable and lubricative polyacetal or nylon.

The roller 9 is made of roller ball coated as for instance by outer ring 9''' of wear resistant elastic material such as polyurethane rubber on the outside of an iron core 9''. The ball has an outer diameter so large as to roll in contact with each side face of the fixed pressure receiver 3 and the movable pressure receiver 4. When each support 8 of the holder M is made in projection form as in FIG. 4, there is provided a fitting hole 9' slightly larger than said projection so as to have a space with the projection or when each support 8 of the holder M is made in recessed form as in FIG. 5, there is provided some space between the ball and the recess to fit freely and slightly movably with each support 8 of the holder M. Thereby the roller 9 can rotate by itself when the sheave moves and can revolve not contacting one point of a slidable body alone by the holder M which is made possible to move in axial direction.

The holder M is made in an adequate length to be movable in axial direction. The supports 8 aligned inside 7 and the roller 9 supported by the support 8 are fitted idly having a space therebetween. Outside of each roller 9 formed in flat door wheel type is same in width with the interval between the pressure receivers 3, 4 and is made to contact the pressure receivers 3, 4. When the holder M is equipped between the pressure receivers 3 and 4, 3 and 4, both sides of each roller 9 are not obstructed by the support 8 and therefore free of trouble, but both sides exactly contact pressure receivers 3 and 4, 3 and 4. Therefore, when each sheave 1, 2 rotates with the main shaft S, all the rollers 9 receive pressure uniformly from each pressure receiver 3 and 4. It seldom happens that some rollers break by strong pressure and other rollers do not work. It is also possible to transmit large horse power by changing number, diameter, and width of roller balls.

The holder M thus determines its length properly to form a space 17 at the end. When the movable sheave 2 moves in axial direction by means of speed change mechanism and changes effective diameter of V-pulley between the sheaves 1 2, the holder M rotates by itself by the friction of the roller 9 given in tangential direction. At the same time it moves to said space 17 and thereby convert the drive of a speed change gear or the drive of the movable sheave 2 to rolling friction. This causes the drive to take very light and easy operation. Further, as the roller 9 will take desirable position at all times, it does not give rise to wear solely on one place. It rather increases endurance of the device greatly.

In the embodiment shown in FIGS. 6 to 11, there are arranged in parallel a plurality of rollers 9 supported by the holder M contacting the rollers between the pressure receivers 3, 4 provided on the fixed and movable sheaves in order to facilitate the movement of the sheaves. And the fixed pressure receiver 3, movable pressure receiver 4 and holder M are related in cooperation by interlocking mechanism U in order that the holder M can make an interlocking movement forcibly in a definite relative movement with the movable sheave.

Figure 2:
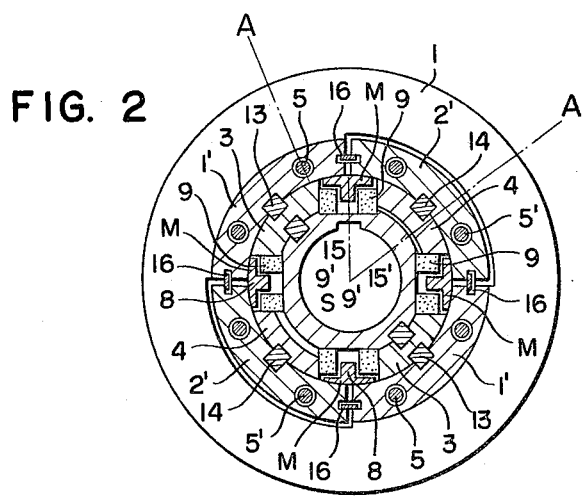
FIG. 2 is a front view in cross section on the line B—B in FIG. 1.
Figure 4:
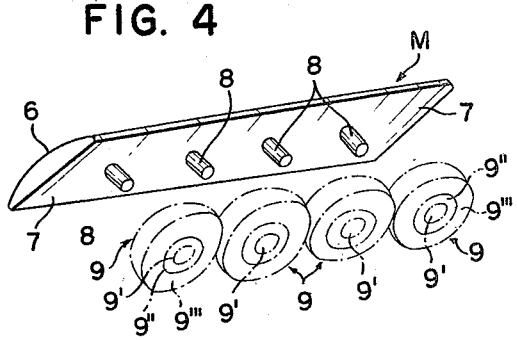
FIG. 4 is a pictorial view of a part of the device according to this invention.
Figure 3:
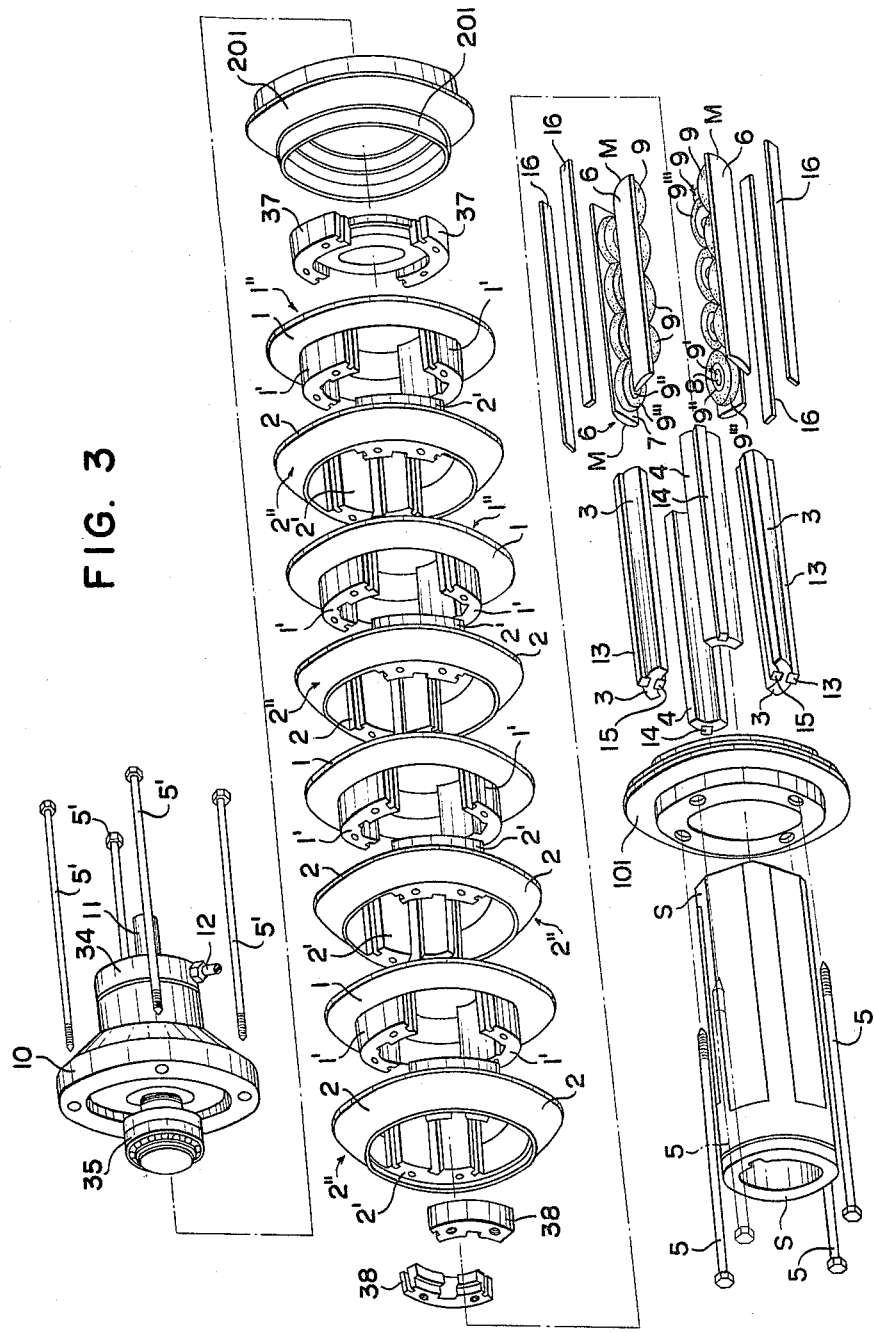
FIG. 3 is an exploded view showing a separated part of the device according to this invention.
Figure 5:
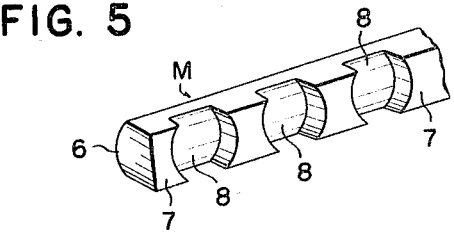
FIG. 5 is a pictorial view showing other example of the same part as in FIG. 4.
Figure 6:
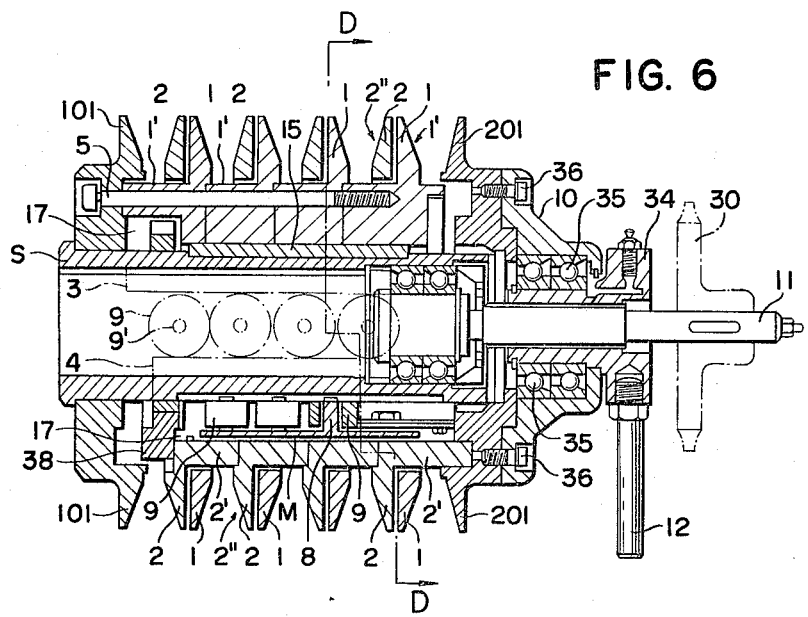
Figure 7:
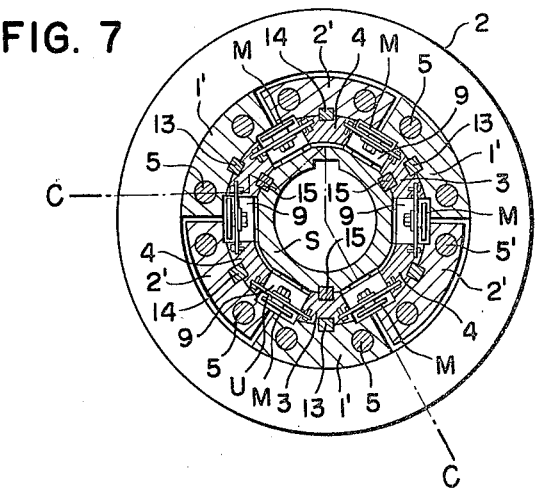
Figure 11:
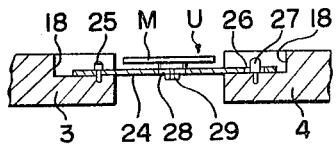

The sheave discs 1 and 2 have circular extended bosses 1' and 2' of sextant circle and have each pressure receiver 3 and 4 of slightly fan-form in cross section integrally with rods 13 and 14 similarly to those shown in FIGS. 1 to 3. The sheaves 1 and 2 on the same side are each connected by rods 5 and 5' forming sheave groups and fitted into the main shaft S. The sheave group on one and same side is fixed on the main shaft S by the key 15 to be referred to as the fixed sheave, and a sheave group on other and same side is made to slide in axial direction by a desirable method along the fixed sheave (Illustration shows screw feeding).

The holder M is similarly provided as supporting rollers 9 having proper width, movable length and contour to be adequately fitted between the fixed and movable pressure receivers 3 and 4.

The interlocking mechanism U interlocking the fixed pressure receiver 3, movable pressure receiver 4 and holder M in a fixed relative movement will take either a gear system or a lever system. In the gear system shown in FIGS. 6 to 9, there are provided partly notched parts 18 and 18 on the end portions of each fixed pressure receiver 3 and each movable pressure receiver 4 both facing opposite each other. On each notched part is fixed a rack plate 20 having rack teeth 19 fixed by bolts 21 and between the rack plates 20 and 20 are provided gears 23 supported on the holder M being meshed with the rack teeth 19. In the lever system shown in FIGS. 10 and 11, there is provided a connecting rod 2 between the notched parts 18 and 18 of the pressure receivers 3 and 4 bridged therebetween. The connecting rod is pivoted 25 on the fixed pressure receiver 3 and engaged 27 on the movable pressure receiver 4 within a long hole 26 movably suppotring the holder M in a guide hole 28 at a suitable place on the connecting rod 24. In either case, the mechanism is arranged in the manner that when the movable pressure receiver 4 moves in axial direction, said means is enforced to move a fixed distance in relative interlocking with the movable pressure receiver without causing trouble in the revolution of each roller 9 by natural leaning to one side in the holder M owing to vibration of the speed change gear system, but supporting a plurality of rollers 9 supported by the holder M to be possible to roll at all times.

Figure 12:
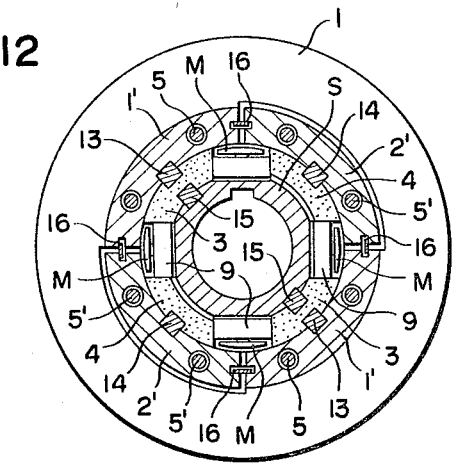
Figure 13:
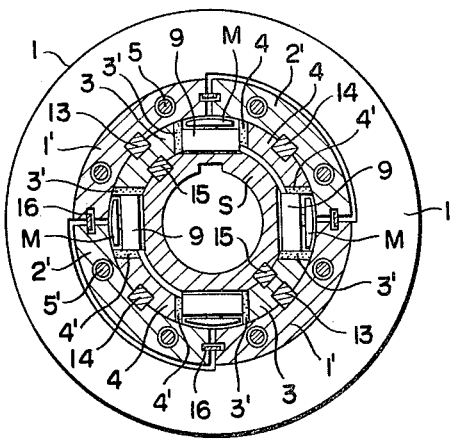

Therefore, in this embodiment, the relative position of the holder M of the roller 9 and the movable pressure receiver 4 is held by the interlocking mechanism U mentioned above, so that it is possible to move the holder M along a fixed distance in a definite relationship with the movable sheave group and control its movement adequately. Every roller 9 will not move to one side by the vibration of the device but it can roll smoothly at all times to carry out the movement of the movable pressure receiver 4 lightly and irresistibly and by a little power not producing a large wear. FIGS. 12 and 13 represent a V-pulley in which sheave discs on the same side are connected by the extended bosses 1' and 2' provided on the sheave discs 1 and 2 and these discs are combined facing opposite with each other. The sheave discs on one side along are moved in axial direction by a pitch changing cylinder to change effective diameter of the sheave disc, whereby corrosion of metallic parts of each pressure receiver 3 and 4 and roller 9 is avoided. FIG. 12 shows an example of an embodiment, in which each pressure receiver 3 and 4 is formed of hard rubber, synthetic resin and other shock absorbing and wear resistant elastic material and fastened rigidly to the extended bosses 1' and 2' of the sheave discs 1 and 2. The embodiment shown in FIG. 13 concerns pressure receivers 3 and 4 composed of metallic members fixed by the rods 13 and 14 to the extended bosses 1' and 2' coated by the pressure receiving pieces 3' and 4' of elastic materials having shock absorbing and wear resistant characteristics such as hard rubber, synthetic resin, etc. contacting the pressure receivers 3, 4 to the roller 9 elastically.

Above is an example of an embodiment in which one side sheaves are fixed on the main shaft S to serve as the fixed sheave 1 and other side sheaves are moved forward and backward by any desirable way in forming a V-pulley by the application of this invention. However, the invention can be applied effectively also to a construction proposing to move both sheaves 1 and 2 in reverse direction simultaneously against the shaft S.

Figure 14:
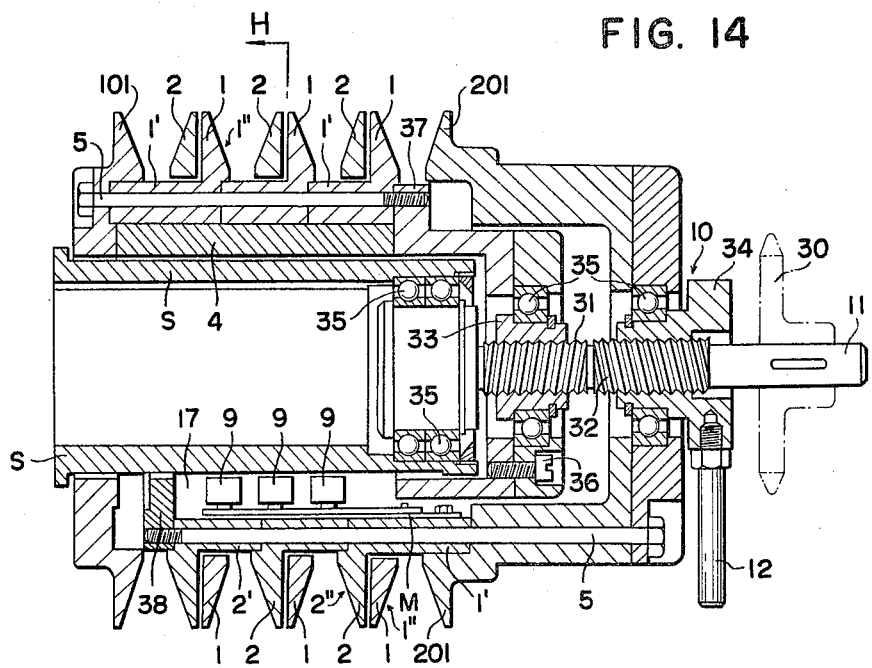
Figure 15:
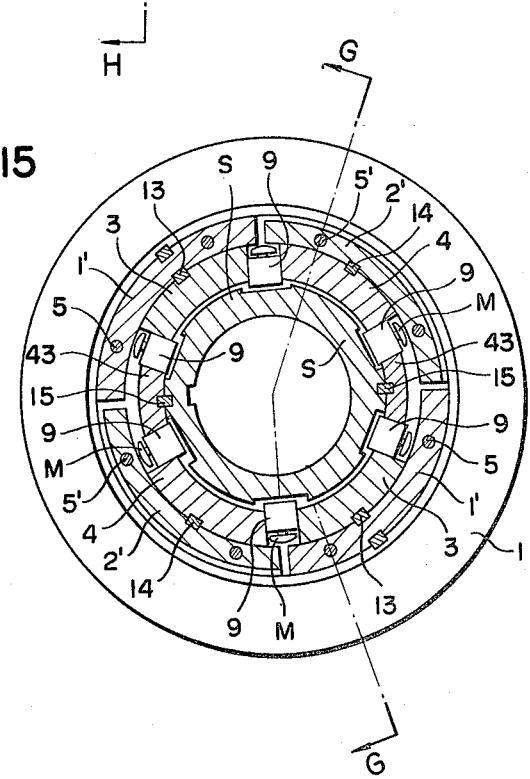

As shown in FIGS. 14 and 15, in a V-pulley which comprises connecting both sheave discs 1 and 2 by the extended bosses 1' and 2' to combine the sheave discs 1 and 2 oppositely, transferring each of them correlatively in the opposite direction to vary the effective diameter, the pressure-receivers 3 and 4 are provided on each of the sheave discs 1 and 2, and the pressure-receiver 43 is provided on the main-shaft S, and on the said main shaft S between the pressure receiver 43 provided on the main shaft S and the receivers 3 and 4 of the sheave discs 1 and 2 provided opposite to the pressure receiver 43. Also between the pressure receiver 43 provided on the main shaft S and the pressure receiver 3 and 4 provided each on both sheave discs 1 and 2 are mounted on a plurality of rollers 9 being supported by the holder M freely between the pressure receivers 3, 4, 43.

A screw feeding of speed change driving device 10 is employed in this embodiment as a means to move both sheave discs 1 and 2 simultaneously in reverse direction along the main shaft S, said speed change drive shaft 11 is fixed to the main shaft S concentrically therewith by bearing 35 and at the same time provided with left and right screws having same pitches.

One side sheave discs 1 are connected to an outer cylinder 33 engaged with one side screw 31 by the bearing 35 and other side sheave disc 2 is connected to an outer cylinder 34 engaged with other side screw 32 by the bearing 35. Both disc groups are enabled to move oppositely either in approaching or leaving direction by the rotation of said speed change drive shaft 11.

12 is a suspension rod for stopping provided on the other cylinder 34 on one side abutting an appropriate fixed part and preventing the revolution of the outer cylinder 34, drive shaft 11, and other outer cylinder 33 to revolve accompanying the sheave discs 1 and 2.

The extended bosses 1' and 2' of both disc groups 1 and 2 are fixed fan-like pressure receivers 3 and 4 by rods 13 and 14 respectively. On the main shaft S is fixed a pressure receiver 43 by a rod 15. Between the pressure receivers 3, 4 and 43 there is interposed a roller 9 by the holder M. When each sheave disc 1, 2 rotates with the main-shaft S, all the rollers 9 receive pressure uniformly from respective pressure receivers 3, 4, 43 similarly as the preceding example.

The driving means 10 serves to change pitches to change the effective diameter of the pulley, by which change of speed and pitch can be made easily by the revolution of the pitch changing screw without replacing the pulley. The drive shaft 11 is provided with sprocket gear 30 which is interlocked with other mechanism and moves the movable sheave group through the driving means 10 in order to change the effective diameter between respective sheaves.

In the drawings, 16 is a dust proof plate fitted between the extended bosses 1' and 2' when required, 101 an end sheave of the fixed sheave group, 201 an end sheave of the movable sheave group, 36 a fitting rod, 37 a fixed sheave locking plate, and 38 a movable sheave locking plate.

The invention as described above is not restricted of modification or alteration in constitution and construction without departing from the spirit of the invention.

This invention can easily overcome various drawbacks of the conventional stepless speed change gear being possible to avoid occurrence of shock, wear and mechanical slackness due to its revolution without difficulty. It can elevate the durability of the device greatly and make its maintenance time longer than usual.

Furthermore, this invention is featured with possibility of interposing much more rollers than other between the main driving body and the following driven body and of converting the movement of the movable sheave to rolling friction affording an axial movement very lightly and easily. The rollers can therefore take desirable position at all times without producing wear at one place alone. Therefore endurance of the roller is much increased.

According to this invention, it is possible to afford all the rollers of multiple number interposed between both sheaves to receive uniform load thereby supporting the load in dissipation and available for the transmission of great horsepower. Since the invention can avoid dispersion of dust and lubricating oil in the device exactly, slackness or breaking scarcely happens, so that any strict precision or precaution is not needed for the manufacture in consideration of tolerance. Easy production and lesser costs are economical features of the device of this invention.

Moreover, this invention does not give rise to a leaning of constituting members to vibration of the device relative to the movement of the movable sheave groups. The rollers are enabled to roll precisely always without giving resistance to the movement of the movable sheave or without causing a great deal of wear and is capable to move the movable sheave smoothly by small power, reasonably and efficiently. At the same time, considerable shock and sliding wear of contact parts during rotation of many rollers can be absorbed or removed. One more feature of this invention is to make it possible to avoid wear of internal mechanism by small vibration caused for the variable V belt pulley working in whatever high and long revolution. There does not take place wave-like wear due to stripping off of surfaces of sliding and contact parts, but rather increases endurance of such sliding and contact parts reducing frictional resistance at the sliding moment and making the speed change motion easier. This results in simple and solid construction and lesser cost.

What we claim is:

1. A stepless speed change gear comprising an elongated hub, a plurality of sheave discs fixedly mounted on said hub, a plurality of sheave discs slidably mounted on said hub, one of each of said slidable sheave discs co-operating with a respective one of said fixed sheave discs to form a V-pulley of variable effective diameter, first pressure receivers fixed to said fixed sheave discs, second pressure receivers fixed to said movable sheave discs, said first and second pressure receivers being alternately spaced around the periphery of said hub, each pressure receiver having a pair of contact faces cooperating in spaced relation with contact faces on adjacent pressure receivers to define roller receiving channels about the periphery of said hub between each adjacent first and second pressure receivers, a holder slidable in each of said channels, a plurality of rollers rotatably supported by each of said holders and in engagement with proximate contact faces, and means cooperating between said first pressure receivers, said second pressure receivers and said holders for shifting said second pressure receivers and said movable sheave discs with respect to said first pressure receivers and said fixed sheave discs and concurrently moving said holders with respect to said first and second pressure receivers.

2. A stepless speed change gear as claimed in claim 1 wherein each of said holders comprises an elongated segment having a width less than the diameter of said rollers whereby the periphery of said rollers project outwardly therefrom an engagement with said contact faces, said holders being further provided with means for rotatably supporting said holders.

3. A stepless speed change gear as claimed in claim 2 wherein said last-named means comprises a plurality of stub shafts secured to and extending from said holder, one of said rollers being rotatably mounted on each of said stub shafts.

4. A steples speed change gear as claimed in claim 2 wherein said last-named means comprises a plurality of circular undercuts each having a diameter sufficiently large to receive one of said rollers for rotation within said undercut.

5. A stepless speed change gear as claimed in claim 1 wherein said last-named means includes a rack plate secured to each of said first and second pressure receivers on opposite sides of each holder, and a gear rotatably mounted on each holder and in engagement with a rack plate on a proximate first pressure receiver and a rack plate on a proximate second pressure receivers.

6. A stepless speed change gear as claimed in claim 1 wherein said last-named means comprises a plurality of levers, one for each adjacent set of first pressure receiver, second pressure receiver and intermediate holder, means pivoting one end of said lever to said first pressure receiver, means pivoting the other end of said lever to said second pressure receiver and means pivoting said lever, intermediate its ends, to said holder, said means pivoting said lever to said second pressure receiver and said holder including means to permit longitudinal movement of said second pressure receiver and said holder with respect to said lever.

7. A stepless speed change gear as claimed in claim 1 and including means for shifting said hub and sheave discs fixedly mounted thereon concurrently with the movement of said movable sheave discs comprising a rotatable shaft having a first threaded section of one hand and a second threaded section of an opposite hand, said means for shifting said movable sheave discs with respect to said fixed sheave discs cooperatively engaged with one of said threaded sections, and means on said hub cooperatively engaged with said other threaded sections.

References Cited by the Examiner

UNITED STATES PATENTS 2,633,752  4/1953  Pixley _____ 74—230.17

DAVID J. WILLIAMOWSKY, *Primary Examiner.*

L. H. GERIN, *Assistant Examiner.*